(12) United States Patent
Herczeg

(10) Patent No.: US 6,805,730 B2
(45) Date of Patent: Oct. 19, 2004

(54) CONVOLUTED SURFACE HOLLOW FIBER MEMBRANES

(75) Inventor: Attila Herczeg, Southborough, MA (US)

(73) Assignee: Amersham Biosciences Membrane Separations Corp., Westborough, MA (US)

( * ) Notice: Subject to any disclaimer, the term of this patent is extended or adjusted under 35 U.S.C. 154(b) by 0 days.

(21) Appl. No.: 10/353,235

(22) Filed: Jan. 28, 2003

(65) Prior Publication Data

US 2003/0140790 A1 Jul. 31, 2003

Related U.S. Application Data

(60) Provisional application No. 60/352,244, filed on Jan. 29, 2002.

(51) Int. Cl.$^7$ .................. B01D 53/22; B01D 63/02; B01D 69/08
(52) U.S. Cl. .............. 96/8; 96/10; 210/321.8; 210/321.89; 210/500.23
(58) Field of Search ........... 96/8, 10; 210/321.8, 210/321.81, 321.89, 321.9, 500.23; 201/500.23; 264/167, 177.13, 177.14, 177.15

(56) References Cited

U.S. PATENT DOCUMENTS

| | | | | |
|---|---|---|---|---|
| 1,773,969 A | * | 8/1930 | Dreyfus et al. | 264/177.13 |
| 2,687,997 A | * | 8/1954 | Marchand | 210/321.78 |
| 3,439,489 A | * | 4/1969 | Holton et al. | 428/399 |
| 3,674,404 A | * | 7/1972 | Burlis et al. | 425/326.1 |
| 3,691,749 A | * | 9/1972 | McKay | 57/248 |
| 4,278,415 A | * | 7/1981 | Pfeiffer | 425/466 |
| 4,288,494 A | * | 9/1981 | Porter et al. | 428/398 |
| 4,291,096 A | * | 9/1981 | Taylor | 428/398 |
| 4,671,809 A | * | 6/1987 | Taketomo et al. | 96/8 |
| 4,744,932 A | | 5/1988 | Browne | |
| 4,769,146 A | * | 9/1988 | Schmidt | 210/321.8 |
| 4,781,833 A | * | 11/1988 | Mizutani et al. | 210/321.81 |
| 4,840,227 A | * | 6/1989 | Schmidt | 165/162 |
| 4,986,837 A | * | 1/1991 | Shibata | 96/6 |
| 5,472,607 A | * | 12/1995 | Mailvaganam et al. | 210/490 |
| 5,755,963 A | | 5/1998 | Sugiura et al. | |
| 5,779,897 A | | 7/1998 | Kalthod et al. | |
| 5,785,851 A | | 7/1998 | Morris et al. | |
| 5,853,582 A | * | 12/1998 | Grangeon et al. | 210/321.89 |
| 5,873,998 A | * | 2/1999 | Grangeon et al. | 210/321.78 |
| 5,914,039 A | | 6/1999 | Mahendran et al. | |
| 6,203,707 B1 | * | 3/2001 | Hartmann | 210/650 |
| 6,217,764 B1 | * | 4/2001 | Bellhouse | 210/321.69 |
| 6,224,763 B1 | | 5/2001 | Feng et al. | |
| 6,264,045 B1 | | 7/2001 | Wilson et al. | |
| 6,333,088 B1 | * | 12/2001 | Le Febre et al. | 428/36.91 |
| 6,354,444 B1 | * | 3/2002 | Mahendran et al. | 210/490 |

FOREIGN PATENT DOCUMENTS

| EP | 0321447 A2 | * | 6/1989 |
|---|---|---|---|
| EP | 0341979 A2 | * | 11/1989 |

* cited by examiner

Primary Examiner—Robert H. Spitzer
(74) Attorney, Agent, or Firm—Royal N. Ronning, Jr.; Stephen G. Ryan; Yonggang Ji

(57) ABSTRACT

Porous hollow polymer fiber membranes having convoluted inside and/or outside surfaces, as well as filter devices comprising a plurality of the hollow fiber membranes, the devices preferably being arranged to direct fluid flow from the inside surface of the membranes to the outside surface, methods of making the membranes, and methods of using the filter devices, are disclosed.

20 Claims, 5 Drawing Sheets

1(a)
- Inside Skin
- Flow Outside to In

1(b)
- Outside Skin
- Flow: Inside to Out

1(c)
- Outside Skin
- Flow: Inside to Out

CONVOLUTED SURFACE HOLLOW FIBER MEMBRANES

This application claims benefit of 60/352,244 filed Jan. 29, 2002

FIELD OF THE INVENTION

This invention pertains to porous hollow fiber membranes.

BACKGROUND OF THE INVENTION

Hollow fiber membranes are generally defined as having an inside surface, an outside surface, and defining a wall and a hollow cavity or bore. They are typically arranged in a filter device as a plurality or bundle of fibers, and utilized for a variety of filtration applications. In some filtration applications, referred to as "inside-out" flow applications, the hollow fiber membranes in the filter device each have small pores at the inner surface and large pores at the outer surface, and the fluid to be filtered is passed through the inlet of the device into the bores of the membranes such that a portion of the fluid is passed from the inside surface of the fiber to the outside surface and through one outlet of the device, and another portion passes tangentially or parallel to the inside surface and through another outlet of the device. The fluid passing into the device and bore of the membrane is commonly referred to as the feed (the feed contains various sized molecules and/or species and possibly debris), the fluid passing from the inside surface to the outside surface is commonly referred to as the permeate or the filtrate (the permeate or filtrate contains the smaller molecules and/or species that will pass through the pores of the membrane), and the fluid passing parallel to the inside surface of the membrane without passing to the outside surface is commonly referred to as the retentate (the retentate contains the larger molecules that do not pass through the pores of the membrane).

Conventional hollow fiber membranes used in inside-out applications have suffered from a number of deficiencies, particularly due to fouling of the inside surface. Fouling typically refers to the accumulation of material on the inside surface of the membrane. This accumulated material can block the pores of the membrane, thus preventing or reducing the passage of the desired product or molecules into the permeate. Once the surface is fouled, filtration efficiency is decreased, and the fibers need to be cleaned or replaced. Additionally, some membranes are difficult to clean. These problems can be magnified in filter devices including a plurality of hollow fibers, since some fibers can become more heavily fouled than others, resulting in uneven flow.

The present invention provides for ameliorating at least some of the disadvantages of the prior art. These and other advantages of the present invention will be apparent from the description as set forth below.

BRIEF SUMMARY OF THE INVENTION

In accordance with an embodiment of the invention, a porous hollow fiber membrane is provided comprising convoluted inner and/or outer porous surfaces. In more preferred embodiments, the convoluted inner and/or outer surfaces are in the form of a sinusoidal shape over an arc.

Hollow fiber membranes having at least one convoluted surface, preferably at least a convoluted inside surface, have improved capacity over typical hollow fiber membranes in that the inventive membranes have increased surface area available for filtration. The convoluted porous surfaces are permeable, e.g., active, in that fluid passes through the surfaces. Such porous membranes are particularly useful in filter devices used for tangential flow filtration applications, but can also be utilized in dead end (also referred to as direct flow) filtration applications, wherein the devices include filters having a plurality of hollow fibers.

BRIEF DESCRIPTION OF THE DRAWINGS

FIG. 1a shows a hollow fiber membrane having smaller pores on the inside surface than on the outside surface, and convoluted inside and outside surfaces, wherein filtrate flow is from the outside surface to the inside surface. FIG. 1b shows a hollow fiber membrane having smaller pores on the outside surface than the inside surface, and a convoluted inside surface, wherein permeate flow is from the inside surface to the outside surface. FIG. 1c shows a hollow fiber membrane having smaller pores on the outside surface than the inside surface, and convoluted inside and outside surfaces, wherein permeate flow is from the inside surface to the outside surface.

FIG. 7 shows diagrammatic cross-sectional views of exemplary hollow fiber membranes, wherein the membranes have convoluted inner or outer surfaces, and the convolutions are in a predetermined sinusoidal shape over an arc.

DETAILED DESCRIPTION OF THE INVENTION

In accordance with embodiments of the present invention, a porous hollow fiber membrane is provided comprising an inside surface and an outside surface, wherein at least one of the surfaces comprises a convoluted porous surface. The hollow fiber membrane comprises (e.g., when viewed in cross-section) a convoluted inside surface and/or a convoluted outside surface. Preferably, at least one surface forms a sinusoidal shape over an arc. In accordance with an even more preferred embodiment, the sinusoidal shape is in the form of a predetermined pattern.

In accordance with preferred embodiments of the invention, a porous hollow fiber membrane comprises an inside porous surface and an outside porous surface, and a bore, the membrane having an inside diameter and an outside diameter, wherein the inside diameter and/or the outside diameter has a sinusoidal shape over an arc.

Preferably, the membrane comprises a polymer membrane.

In accordance with this embodiment of the invention, the convolutions can be composed of bumps, protrusions, or projections of any shape with alternating crevices, e.g., conical, paraboloidal, hemispherical, wave like, or sinusoidal. The convolutions can be positioned in any direction to the length of the fiber, e.g., parallel, perpendicular, or at an angle in between. As noted above, the convoluted porous surfaces are permeable, e.g., active, in that fluid passes through the surfaces. Accordingly, the convolutions provide active surface area available for filtration.

Figure 7A:
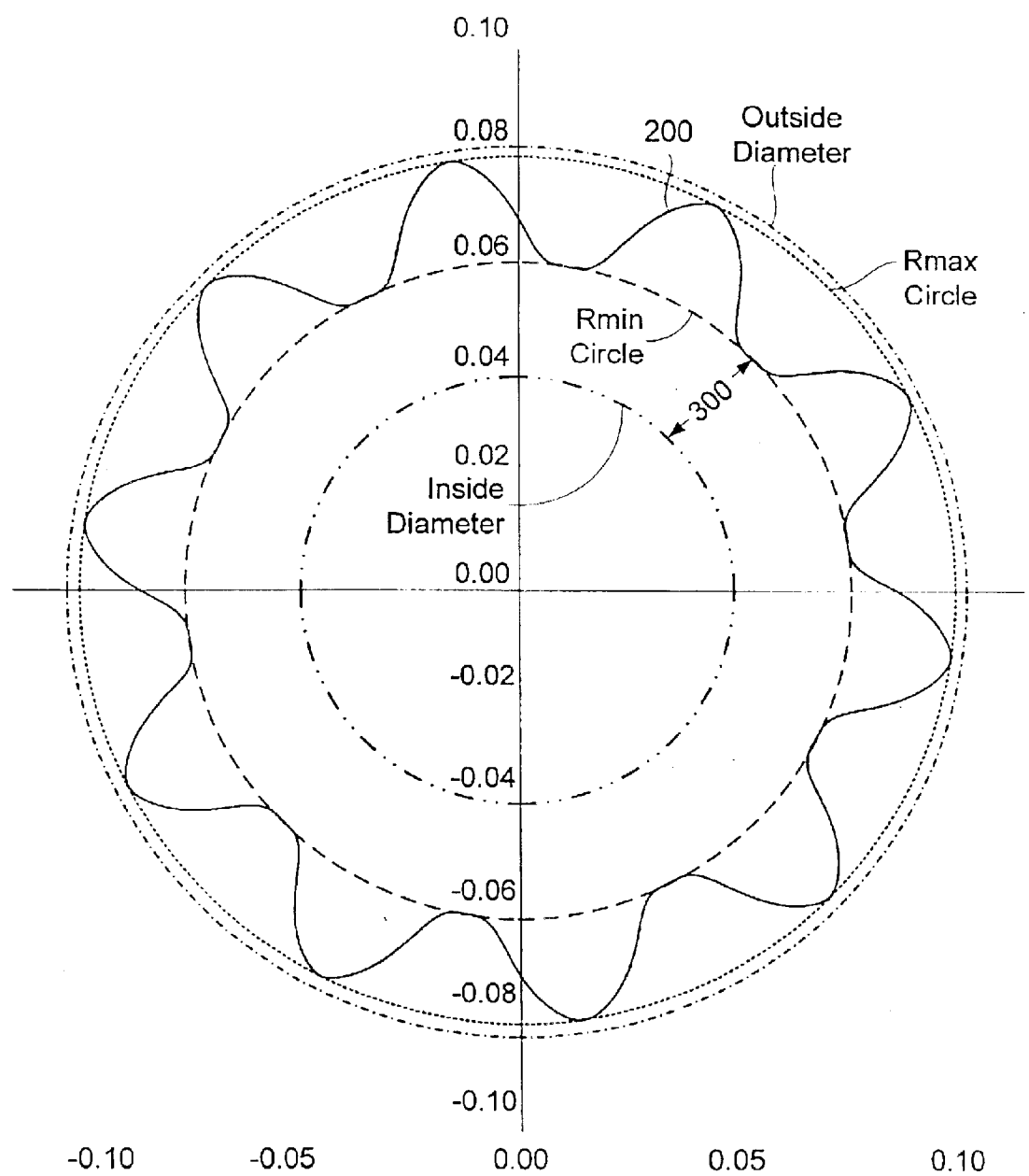
FIG. 7a shows a membrane having a predetermined sinusoidal shape over an arc for the outside surface.
Figure 7B:
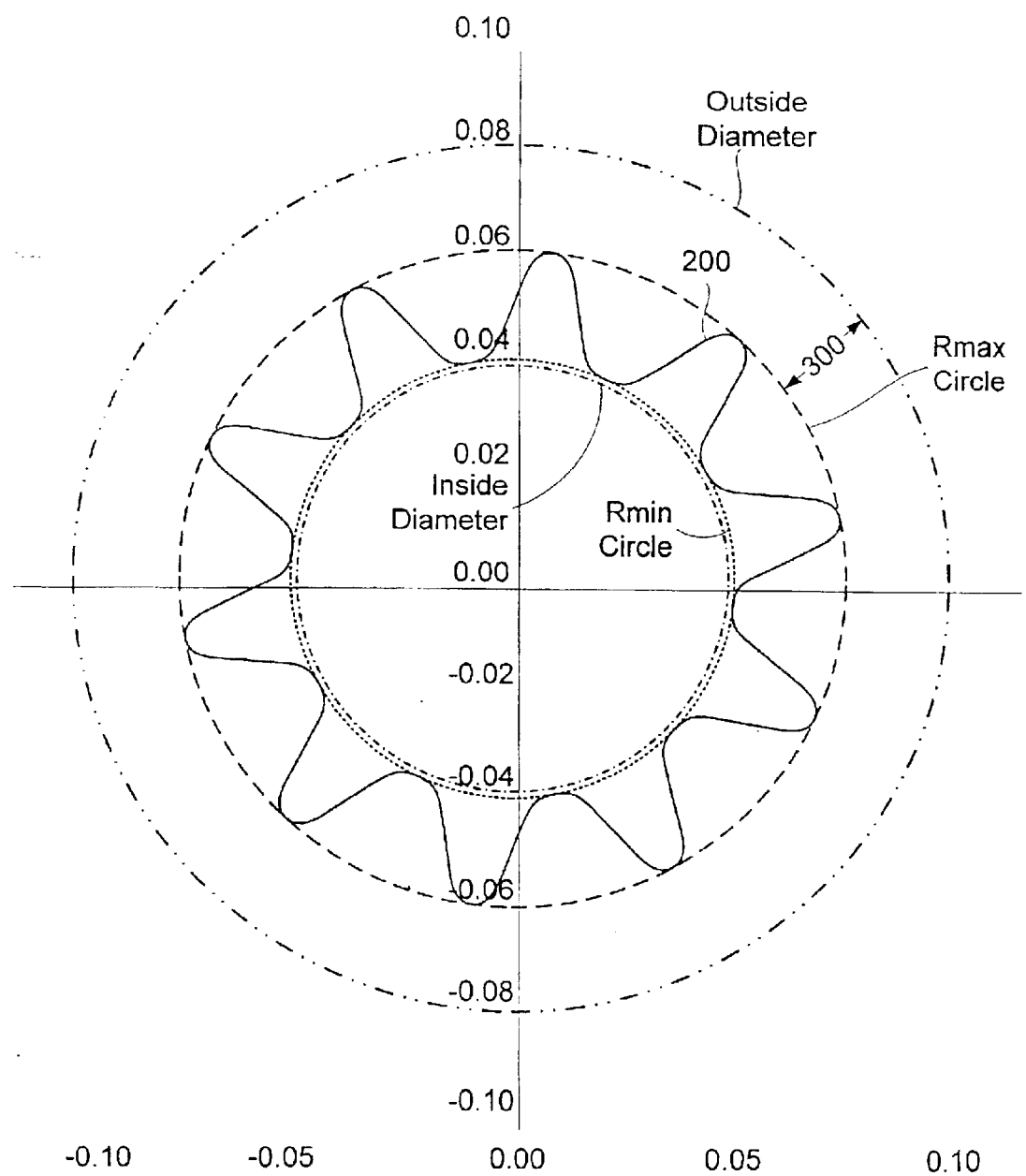
FIG. 7b shows a membrane having a predetermined sinusoidal shape over an arc for the inside surface

Preferably, the convolutions are sinusoidal in shape, more preferably, with a predetermined pattern, e.g., as shown in FIGS. 7a and 7b. In accordance with the embodiments illustrated in FIGS. 7a and 7b, the sine wave patterns are uninterrupted. The patterns shown in FIGS. 7a and 7b, that are applicable to any hollow fiber membrane, can be determined by the following formulas:

1. To generate sine wave $$X_{sw} = \acute{R} \cos \theta$$

$$Y_{sw} = \acute{R} \sin \theta$$

where $$\acute{R} = r_{avg} + A \sin (\theta \text{ multiplied by } C)$$

where $r_{avg}$=average radius=$(R_{maxsw}+R_{minsw})/2$
A=amplitude=$(R_{maxsw}-R_{minsw})/2$
$\theta$=Angle in Radians
C=# cycles per circumference (dimensionless)
$\acute{R}$=Intermediate Radius
$X_{sw}$=Rectangular co-ordinate of sin wave (X)
$Y_{sw}$=Rectangular co-ordinate of sin wave (Y)

2. To approximate the arc length of the sine wave $$S = \sum_{\theta=0}^{360} ([\Delta X_\theta]^2 + [\Delta Y_\theta]^2)^{1/2}$$

where $\theta$=Angle in Degrees
$\Delta X_\theta$=Incremental change in X with $\theta$
$\Delta Y_\theta$=Incremental change in Y with $\theta$
S=Arc Length The Arc Length, when multiplied by the length of the hollow fiber membrane, provides the surface area of the membrane.

In accordance with these equations, the inner and outer diameters of the hollow fiber membrane, and the amplitude and number of sine waves (over the outer circumference) can be preselected, and the pattern of the convolutions on the inner or outer surfaces can be predetermined, along with the resultant active surface area of the membranes available for filtration. The equations also show the increase in surface area relative to conventional surfaced membranes having similar inner and/or outer diameters.

When utilizing the equations, the results can be represented in graphic form as illustrated in the cross-sectional views shown in FIGS. 7a (outer surface convoluted) and 7b (inner surface convoluted). The sine wave function is represented by the solid line (200) having a sinusoidal shape over an arc (the arc representing the inner or outer diameter of the membrane). The non-convoluted region (300) shows the portion of the membranes primarily providing support and/or strength to the membranes.

FIGS. 7a and 7b show the resultant fiber in cross-section when the following values are preselected: inner diameter, outer diameter, number of cycles/circumference; Rmax, and Rmin. In FIGS. 7a and 7b, both fibers have the following values: inner diameter 0.040 inches (1 mm); outer diameter 0.080 inches (2 mm); number of cycles/circumference=10.

With respect to Rmax and Rmin, in FIG. 7a (outer surface convoluted), Rmax is 0.079 inches, and Rmin is 0.060 inches (1.5 mm). In FIG. 7b (inner surface convoluted), Rmax is 0.060 inches (1.5 mm) and Rmin is 0.041 inches. Using the embodiment shown in FIG. 7a for general reference, for a hollow fiber membrane having an outer convoluted surface, the outer diameter is typically equal to Rmax. In the illustrated embodiment, the Rmax (0.079 inches) differs from the outer diameter (0.080) to show the different lines. However, since the values are typically the same, the two lines would be superimposed on each other.

Similarly, using the embodiment shown in FIG. 7b for general reference, for a hollow fiber membrane having an inner convoluted surface, the inner diameter is typically equal to Rmin. In the illustrated embodiment, the Rmin (0.041 inches) differs from the inner diameter (0.040) to show the different lines. However, since the values are typically the same, the two lines would be superimposed on each other.

Rmin and Rmax show where the convolutions begin and end. For an outer surface convoluted membrane (FIG. 7a), the region between the inner diameter and Rmin represents the region primarily providing support. For an inner surface convoluted membrane (FIG. 7b), the region between the outer diameter and Rmax represents the region primarily providing support.

With respect to active surface area, the surface area of the membranes with at least one convoluted surface is typically at least about 5% or more, preferably at least about 20% or more, and in some embodiments, at least about 50% or more, e.g., about 70% or more, relative to the surface area of a smooth surfaced membrane having a similar inner and outer diameter.

In accordance with an embodiment of the invention, a filter device comprises a housing having an inlet, a first outlet and a second outlet, the housing defining a first fluid flow path between the inlet and the first outlet, and a second fluid flow path between the inlet and the second outlet, a plurality of porous hollow polymer fiber membranes disposed across the first fluid flow path and substantially parallel to the second fluid flow path, each porous hollow fiber membrane having a convoluted inside surface, and an outer surface, wherein the housing is arranged to direct a portion of fluid (preferably, a permeate) from the inlet, through the convoluted inner surface and the outer surface of the porous hollow fibers, and through the first outlet, and direct another portion of fluid (preferably, a retentate) from the inlet, along the convoluted inner surface, and through the second outlet.

A method for processing a fluid suspension according to an embodiment of the invention comprises providing at least one porous hollow polymer fiber membrane having an inner convoluted porous surface and an outer porous surface; contacting the inner surface of the membrane with a feed fluid comprising larger and smaller macromolecules, and passing a permeate containing the smaller macromolecules from the inner surface to the outer surface. In a more preferred embodiment, the method also comprising passing a retentate containing the larger macromolecules along the bore of the membrane. Embodiments of the method comprise dead end filtration and tangential flow filtration.

In accordance with another embodiment, a method of separating a fluid into a retentate and a permeate comprises directing a feed suspension comprising larger macromolecules and smaller macromolecules into the central bore of a hollow fiber membrane, the membrane having an inner porous convoluted surface and an outer porous surface; passing a permeate containing the smaller macromolecules from the inner surface to the outer surface; and passing a retentate containing the larger macromolecules along the central bore of the membrane.

In accordance with another embodiment, a method of separating a fluid into a retentate and a permeate comprises directing a feed suspension comprising larger species and smaller species into the central bore of a hollow fiber membrane, the membrane having an inner porous convoluted surface and an outer porous surface; passing a permeate containing the smaller species from the inner surface to the outer surface; and passing a retentate containing the larger species along the central bore of the membrane.

In accordance with yet another embodiment of the invention, a method of preparing a hollow fiber membrane comprises providing a spinning dope comprising a first polymer, a solvent, and a nonsolvent, in ratios sufficient to form a homogenous solution or a colloidal dispersion; extruding the dope in the form of a hollow pre-fiber from a nozzle having an orifice with at least one convoluted surface, the pre-fiber having an inside surface and an outside surface; contacting the outside surface of the pre-fiber with a coagulating medium; and coagulating the pre-fiber from the outside surface to the inside surface to provide a hollow fiber membrane having a convoluted inner and/or outer surface.

In accordance with another embodiment of the invention, a method of preparing a hollow fiber membrane comprises providing a spinning dope comprising a first polymer, a solvent, and a nonsolvent, in ratios sufficient to form a homogenous solution or a colloidal dispersion; extruding the dope in the form of a hollow pre-fiber from a nozzle having an orifice with at least one convoluted surface, the pre-fiber having an inside surface and an outside surface; contacting the inside surface of the pre-fiber with a coagulating medium; and coagulating the pre-fiber from the inside surface to the outside surface to provide a hollow fiber membrane having a convoluted inner and/or outer surface.

Some embodiments of the method comprise forming a progressively asymmetric membrane having at least one convoluted surface. Preferably, the spinning dope comprises a first polymer and a second polymer, more preferably, wherein the first polymer comprises a sulfone polymer or polyvinylidene fluoride, and the second polymer is polyvinyl pyrrolidone. In a more preferred embodiment, the method further comprises collecting the hollow fiber membrane on a receiving plate, more preferably, a rotating receiving plate.

Typically, the hollow fiber membranes according to the invention are prepared by phase inversion, preferably, via melt-spinning, wet spinning or dry-wet spinning. Phase inversion can be achieved in several ways, including evaporation of a solvent, addition of a non-solvent, cooling of a solution, or use of a second polymer, or a combination thereof.

In conventional dry-wet and wet-wet spinning processes, a viscous polymer solution containing a polymer, solvent and sometimes additives (e.g., at least one of a second polymer, a pore former, a nonsolvent and, if desired, a surfactant) is pumped through a spinneret (sometimes referred to as the spinning nozzle or extrusion head), the polymer solution being mixed and stirred to provide a homogenous solution or a colloidal dispersion, filtered, and degassed before it enters the extrusion head. A bore injection fluid is pumped through the inner orifice of the extrusion head. In a dry-wet spinning process, the fiber extruded from the extrusion head, after a short residence time in air or a controlled atmosphere, is immersed in a nonsolvent bath to allow quenching throughout the wall thickness substantially uniformly, and the fiber is collected. In a wet-wet spinning process, the extruded fiber does not have residence time in air or a controlled atmosphere, e.g., it passes from the extrusion head directly into a nonsolvent bath to allow quenching throughout the wall thickness substantially uniformly.

However, in accordance with preferred embodiments of the invention, the extruded fiber is not immersed in a coagulation medium. Rather, as explained in more detail below, a coagulation medium is passed from the extrusion head and is placed in contact with the outer surface of the extrudate (or pre-fiber) as the extrudate passes from the extrusion head. As the extrudate is contacted only with the outside surface, coagulation proceeds from the outside surface of the fiber toward the inside surface.

The coagulation medium facilitates gelation of the polymer solution, i.e., the transition of the polymer from a solution state to a gel state. The coagulation medium has a reduced or no solubility for the polymer. As the polymer solution extrudate is contacted (on the outside surface) with the coagulation medium, the solvent diffuses out of the extrudate and at the same time, the coagulation medium diffuses into the extrudate. As a result, the molecular mobility of the polymer chain becomes restricted. A porous microstructure forms characteristic of the volume occupied by the solvent.

The coagulation medium is typically a non-solvent, e.g., water. Preferably, the coagulation medium contains, in addition to a non-solvent, additives such as a solvent, a swelling agent, a wetting agent, or a pore-former. These additives contribute to bring the solubility parameter of the coagulation medium close to that of the polymer solution such that when the contact occurs, the gelation is imminent, and at the same time, that the exchange of solvent and coagulation medium is at a rate suitable to produce the porous structure.

Figure 1:
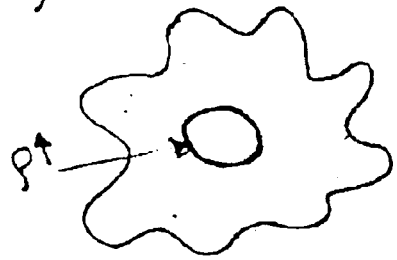
FIG. 1 shows cross-sectional diagrammatic views of embodiments of hollow fiber membranes according to the present invention.
Figure 1:
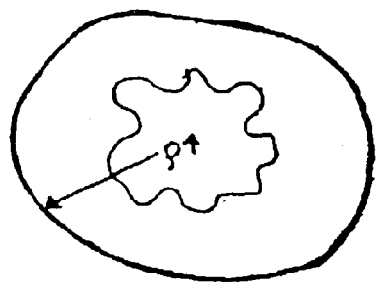
Figure 1:
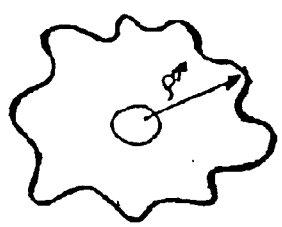
Figure 2:
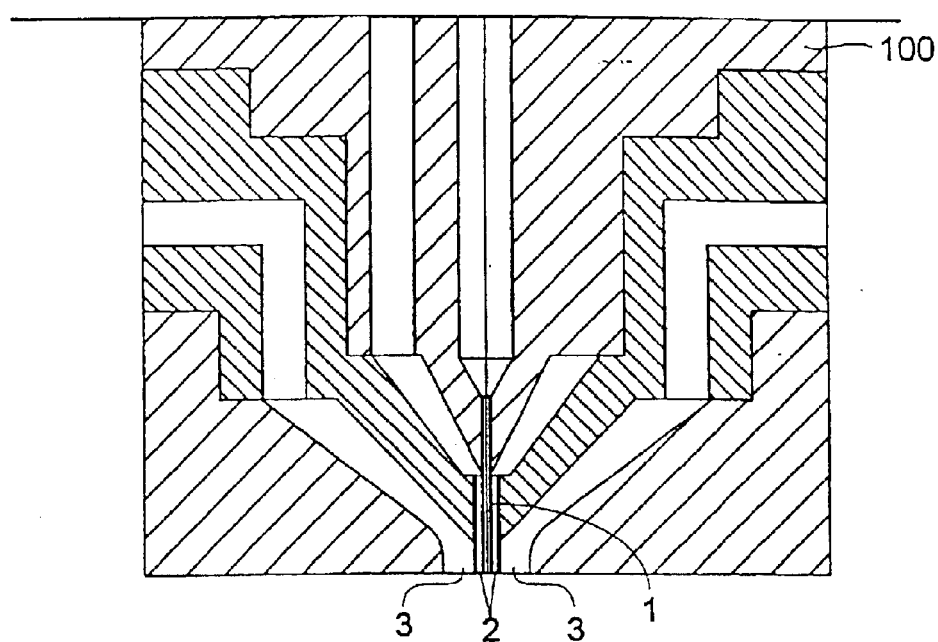
FIG. 2 is a partial cross-sectional side view of an extrusion head for preparing hollow fiber membranes according to the invention.
Figure 3:
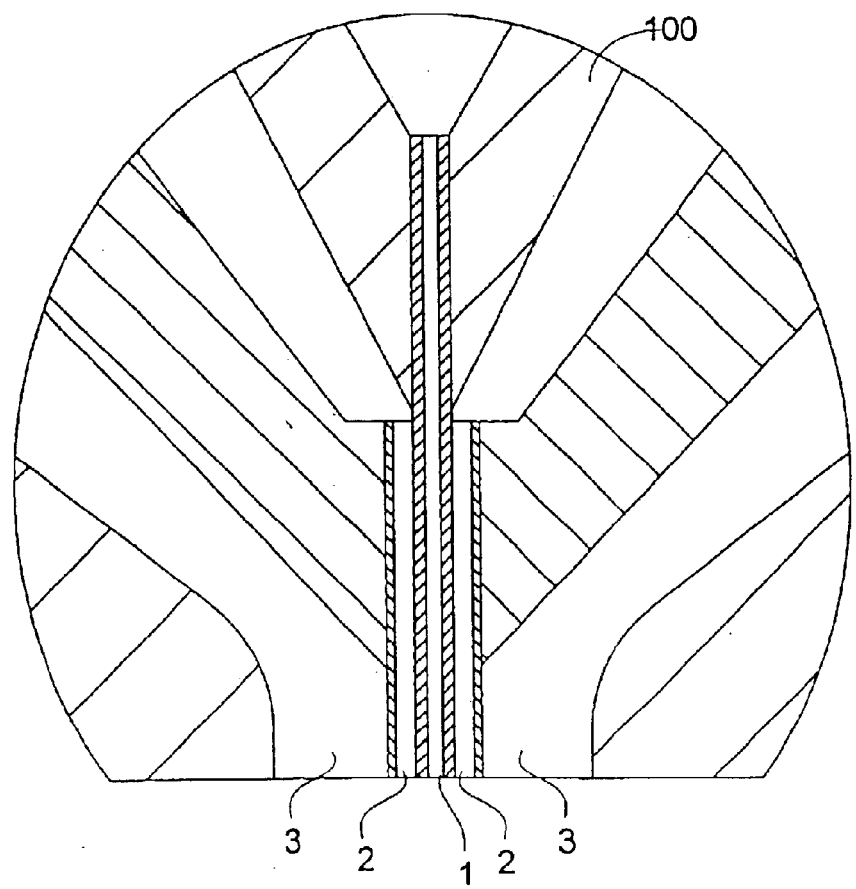
FIG. 3 is an enlarged cross-sectional view of the tip of the extrusion head shown in FIG. 2.

Preferably, the extrudate is passed, via force and/or gravity, from the extrusion head to a receiving plate. The extrusion head used to prepare membranes according to the invention can have a plurality of orifices, e.g., a central bore and at least two surrounding passageways, as shown in FIGS. 2 and 3 for example. Illustratively, in preparing a membrane in accordance With wet spinning processes, the bore injection fluid is pumped through the inner passageway 1 of the extrusion head 100, the viscous polymer solution is pumped through a first passageway 2 surrounding the inner passageway, and a nonsolvent (coagulation medium or quench solution) is pumped through a second (or outer) passageway 3 surrounding the first passageway. The extrusion head can have additional passageways (not shown), e.g., a concentric passageway for another fluid between the passageways for the polymer solution and the coagulation medium.

Figure 4:
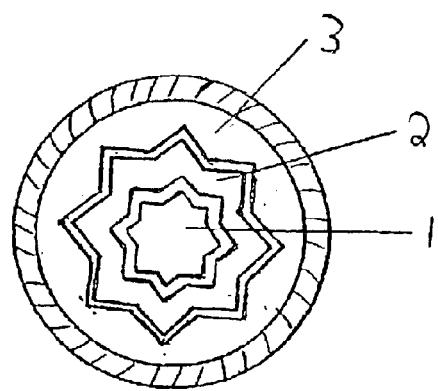
FIGS. 4–6 are partial cross-sectional bottom views of extrusion heads for preparing hollow fiber membranes according to embodiments of the invention. The extrusion head shown in FIG. 4 is suitable for preparing a hollow fiber membrane with a convoluted inner surface, the extrusion head shown in FIG. 5 is suitable for preparing a hollow fiber membrane with a convoluted outer surface, and the extrusion head shown in FIG. 6 is suitable for preparing a hollow fiber membrane with convoluted inner and outer surfaces.
Figure 5:
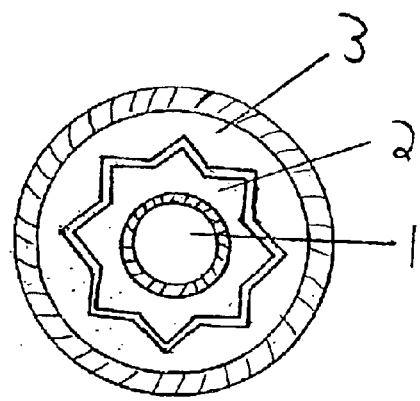
Figure 6:
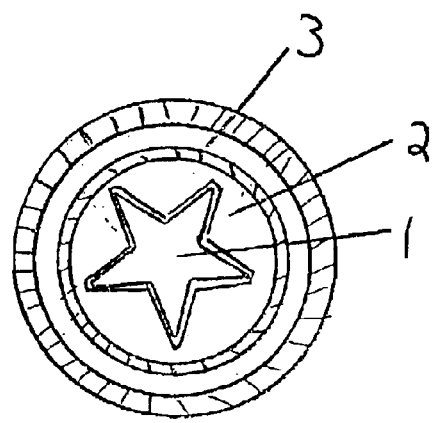

In accordance with preferred embodiments of the invention, the extrusion head has at least one orifice or passageway (typically, at least the orifice or passageway through which the spinning dope passes, e.g., orifice 2 shown in FIGS. 2–6) having a non-round or non-oval inner and/or outer wall, e.g., the orifice bore is irregular. When viewed in bottom cross-section (e.g., as shown in FIGS. 4–6) the orifice can have a variety of shapes and configurations, e.g., the orifice can be lobate (preferably having two or more lobes), or star-shaped.

Additionally, the extrusion head can have at least one element (preferably, comprising a wall of an orifice) that rotates while the other element(s) of the head remain stationary. Accordingly, membranes can be produced having, for example, a convoluted inner surface (e.g., wherein the inner orifice is not rotated while the pre-fiber is extruded) or a convoluted and spiraled inner surface (e.g., wherein the inner orifice is rotated while the pre-fiber is extruded).

The extrusion head preferably has a plurality of passageways. For example, with reference to FIGS. 2–6, the bore injection fluid is passed through the inner irregularly shaped orifice or passageway 1, the spinning dope is passed through the orifice 2 surrounding the inner passageway (e.g., wherein the inner surface of the passageway for the dope is the irregular outer surface of the extrusion head orifice), and a coagulation medium is passed through the outer orifice or passageway 3. Additionally, or alternatively, the extrusion head can have at least one passageway arranged to provide a membrane having a convoluted outer surface, e.g., wherein the outer surface of the passageway for the polymer solution has an irregular surface.

In accordance with one embodiment, a method for making the membrane comprises extruding a polymer spinning dope (polymer, solvent, and nonsolvent solution) into a quenching environment (e.g., non-solvent for the polymer or temperature change causing polymer precipitation) either introduced within the fiber, or on its outside, wherein the extruder has been modified to include a convoluted surface, a spiraled surface and/or a multilobal structure, e.g., having bi, tri, tetra, penta, or higher lobes. The spin dope is appropriately quenched so that the convoluted surface will be incorporated into the hollow fiber during extrusion. If desired, a spiraled and convoluted structure can be provided by turning the interior (or exterior) portion of the extruder as the extrusion of the pre-fiber proceeds.

In some embodiments, particularly those wherein the membrane is skinned and the convoluted surface is not the skinned surface, the convolutions can be made directly during coagulation. Illustratively, fast coagulation during which the coagulant penetrates the membrane surface creates large intrusions or macrovoids. Alternatively, a mixture of a membrane forming polymer and a pore former can be melt-extruded through a suitably modified die, and the pore former leached to produce a fiber.

In yet other embodiments of membranes having convoluted surfaces, membranes can be formed by utilizing differences in pressure between the interior and exterior of the fiber as the fiber is formed. Alternatively, the membrane can be formed by vibrating the quench bath, e.g., by applying sonic, or ultrasonic, energy.

In one embodiment of a membrane having a convoluted inner surface, the pre-fiber can be extruded using an extruder having a conventional annular orifice, while creating a lower internal pressure (e.g., via a slower feed rate of the interior quench solution). Once the inside surface is set via quenching, the pressure differential will cause the inner surface to buckle, creating a convoluted surface. Alternatively, the membrane can be formed by vibrating the quench bath, e.g., by applying sonic, or ultrasonic, energy.

In accordance with a preferred embodiment of the invention, a method for making the membrane comprises extruding a polymer spinning dope (e.g., polymer, solvent, and nonsolvent solution) such that the outside surface of the fiber contacts a coagulation medium to allow porous skin formation on the outside (the outside skin being the fine pored side of the membrane constituting the coagulation medium-dope interface) while introducing a bore injection fluid through the inside bore to prevent the collapse of the bore of the membrane. Accordingly, this embodiment includes coagulating the polymer spinning dope with a coagulation medium on the outer surface of the fiber by extruding the coagulation medium from an outer orifice of the extrusion head simultaneously with the extrusion of the spinning dope from an inner orifice (the spinning dope orifice being arranged between the orifice for the bore injection fluid and the orifice for the coagulation medium) wherein the orifices are aligned to allow the coagulation medium to contact the outside surface of the fiber as it passes from the spinning dope orifice, and while an interior or exterior element of the extrusion head is rotated. Coagulation migrating from the outside porous skin toward the center progressively creates a less dense structure terminating with the open structure on the interior (inside) surface and (in a preferred embodiment) having a progressively asymmetric, graded structure between the inside surface and the outside surface.

If desired, in some embodiments of the invention the hollow pre-fiber leaves the extrusion head completely formed, and there is no need for any further formation treatment except for removing the solvent, and, in some embodiments, placing the membrane in a bath (e.g., containing glycerine and/or polyethylene glycol) to improve the mechanical properties, e.g., the pliability, of the membrane.

In accordance with another embodiment of a method for making a membrane according to the invention, a hollow fiber leaving the extrusion head is passed a desired distance (e.g., via gravity) to a radially rotating receiving plate, allowing the fiber to be easily collected in a desired orientation or configuration (e.g., a coil), more preferably while the fiber on the plate is washed with water. An advantage of this embodiment includes collecting the fiber, preferably in the form of a single coil, without pulling or stretching it, thus reducing stress to the fiber. Additionally, or alternatively, if the fiber breaks, additional fiber can be collected without the labor-intensive effort of threading, weaving or winding the new fiber into the various spools, drums and/or dancer arms of conventional collecting equipment.

If desired, the formed membrane can be placed in a water bath (e.g., to leach the remaining solvent), and/or otherwise processed, e.g., placed in a glycerine/water bath to prevent collapse during storage. Typically, the membrane is dried before storage. The membrane can be stored at any suitable temperature, e.g., in the range of from about 4° C. to about 25° C., more preferably in the range of from about 4° C. to about 15° C. If desired, the membrane can be stored in any suitable storage agent, e.g., buffer or saline solution, aqueous alcohol, sodium hydroxide, or glycerin and sodium azide.

Hollow fiber membranes according to the invention can be produced from any suitable material, e.g., ceramic, metal, or more preferably, a polymer or combinations of polymers. Suitable polymers include, for example, polyaromatics, sulfones (such as polysulfone, polyarylsulfone, polyethersulfone, polyphenylsulfone), polyolefins, polystyrenes, polycarbonates, polyamides, polyimides, fluoropolymers, cellulosic polymers such as cellulose acetates and cellulose nitrates, and PEEK. Other examples include, polyetherimide, acrylics, polyacrylonitrile, polyhexafluoropropylene, polypropylene, polyethylene, polyvinylidene fluoride, poly(tetrafluoroethylene), polymethyl methacrylate, polyvinyl alcohol, polyvinyl pyrrolidone (PVP), polyvinyl chloride, polyester, poly(amide imides), and polydiacetylene, and combinations thereof. Any of these polymers can be chemically modified.

In some embodiments wherein the polymer solution comprises a first polymer and a second polymer, the first polymer is polysulfone (more preferably, polyethersulfone) or polyvinylidene fluoride, and the second polymer is PVP. Typically, PVP is utilized as a pore former and morphology enhancer, and is substantially removed during the preparation of the membrane.

The polymers can have any suitable average molecular weight. However, in some embodiments wherein the polymer (or the first polymer) is a sulfone (e.g., polysulfone, polyethersulfone, polyphenylsulfone, and polyarylsulfone), the polysulfone has an average molecular weight in the range of from about 30,000 to about 60,000 daltons. In some embodiments wherein the second polymer is PVP, the PVP has an average molecular weight in the range of from about 5,000 to about 120,000 daltons, preferably, in the range of from about 10,000 to about 15,000 daltons.

A variety of suitable solvents, pore formers, nonsolvents, surfactants, and additives are known in the art. Suitable solvents can be protic or aprotic. Acceptable aprotic solvents include, for example, dimethyl formamide, N-methyl pyrrolidone (NMP), dimethyl sulfoxide, sulfolane, and dimethyl acetamide (DMAC). Acceptable protic solvents include, for example, formic acid and methanol. Other suitable solvents include, for example, dioxane, chloroform, tetramethyl urea, tetrachloroethane, and MEK.

Suitable pore formers (generally, the concentration of the pore former influences the pore size and pore distribution, including the asymmetry ratio, in the final membrane) include, for example, polyvinyl pyrrolidone (PVP), polyethylene glycol (PEG), and glycerin.

Suitable nonsolvents can be solids or liquids. In general, the concentration of the nonsolvent influences the pore size and pore distribution, and, when utilized as the coagulation medium or quench solution, causes phase inversion (precipitation). Exemplary liquid nonsolvents include, for example, aliphatic alcohols, particularly polyhydric alcohols, such as ethylene glycol, glycerine; polyethylene oxides and polypropylene oxides; surfactants such as alkylaryl polyether alcohols, alkylaryl sulfonates and alkyl sulfates; triethylphosphate, formamide; and aliphatic acids such as acetic or propionic acid. Other suitable liquid nonsolvents include, for example, 2-methoxyethanol, t-amyl alcohol, methanol, ethanol, isopropanol, hexanol, heptanol, octanol, acetone, methylethylketone, methylisobutylketone, butyl ether, ethyl acetate, amyl acetate, diethyleneglycol, di(ethyleneglycol)diethylether, di(ethyleneglycol)dibutylether, and water. Exemplary solid nonsolvents include polyvinyl pyrrolidone, citric acid, and salts such as zinc chloride and lithium chloride.

One preferred embodiment of a spinning dope comprises from about 10 to about 30 wt. % first polymer, more preferably from about 15 to about 22 wt. % first polymer; in the range of from about 8 to about 25% nonsolvent, preferably in the range of from about 10 to about 13 wt. % nonsolvent; in the range of from about 10 to 40 wt. % second polymer, more preferably about 18 to 25 wt. % second polymer; and in the range of from about 35 to about 65 wt. % solvent, more preferably in the range of from about 40 to about 55 wt. % solvent.

The spinning dope should have sufficient viscosity to provide adequate strength to the fiber extrudate as it is extruded from the extrusion head. The viscosity of the spinning dope at the extrusion temperature can be any suitable viscosity, and is typically at least about 1000 centipoise, more typically at least about 5,000 centipoise, and preferably in the range of from about 10,000 to 1,000,000 centipoise.

A variety of spinnerets or extrusion heads are suitable for carrying out the invention. Preferably, the extrusion head is a multi-orifice type, e.g., as shown in cross-sectional side view in FIGS. 2 and 3, and cross-sectional bottom view in FIGS. 4–6. Typical orifice diameters are in the range of from about 0.01 cm to about 0.5 cm, preferably in the range of from about 0.02 cm to about 0.3 cm. However, as is known in the art, the orifice diameters selected will generally depend on the desired hollow fiber dimensions and intended application. For example, using the illustrative heads shown in FIGS. 2–6 for reference, the central orifice or bore 1 in the extrusion head 100 should be large enough to permit sufficient flow of the bore fluid to yield a fiber of the desired size, the orifice 2 through which the spinning dope is extruded is typically sufficient to permit sufficient flow of the spinning dope while providing the desired membrane wall thickness, and the orifice 3 through which the coagulation medium is passed is typically sufficient to permit sufficient flow of the coagulation medium so that it will contact the fiber as it is passed from the orifice 2. In some embodiments of the invention, the central orifice or bore has a general diameter in the range of from about 0.03 cm to about 0.15 cm.

In those embodiments wherein the membrane has at least one convoluted, spiraled surface, the extrusion head has an inner or outer element that rotates while one or more other elements of the head do not. For example, an element including the central orifice 1 can rotate, while the other element(s) remain stationary, an element including the inner or outer wall of orifice 2 can rotate while the other element(s) remain stationary, or an element including the outer wall of orifice 3 can rotate while the other element(s) remain stationary.

The spinning dope is delivered to the extrusion head from a supply source by any means known in the art (e.g., via one or more pumps or gas pressure) that will provide a consistent flow at the desired rate. Typical flow rates are, for example, in the range of from about 0.5 cc/min to about 20 cc/min, more typically, in the range of from about 1 cc/min to about 10 cc/min. However, as is known in the art, the flow rate for a given viscosity is dependent upon the size of the extrusion head and the number and size of the orifices.

Similarly, the bore injection fluid (sometimes referred to as the "core fluid") is also delivered to the spinneret or extrusion head from a supply source by any means known in the art. Alternatively, in some embodiments involving a dry-wet process, the pressure differential between the bore of the orifice in the spinneret and the subatmospheric pressure within the chamber that encases the spinneret can be sufficient to aspirate the core fluid into the spinneret. A variety of bore injection fluids (gas or liquid) can be utilized, and the fluid can include a mixture of components. Preferably, in those embodiments wherein the membrane has larger pores on the inside surface than on the outside surface, the bore injection fluid is not a quenching fluid, e.g., the injection fluid can be, for example, air, nitrogen, $CO_2$, a fluid without strong capacity to impart precipitation, or a fluid with a sufficiently high concentration of solvent so that coagulation does not occur. In other embodiments, e.g., wherein the membrane has smaller pores on the inside surface than the outside surface, the injection fluid can be a quenching fluid.

The coagulation medium is also delivered to the spinneret or extrusion head from a supply source by any suitable means. Preferably, however, the coagulation medium is directed through an orifice aligned with the outside of the spinning dope such that the coagulation medium contacts the outer surface of the extruded pre-fiber as it exits the extrusion head. Typical flow rates are, for example, in the range of from about 40 cc/min to about 150 cc/min. Preferably, the flow rate is in the range of from about 60 to about 120 cc/min.

Typically, the temperatures of each of the spinning dope, the core fluid, and the coagulation medium are controlled (in some embodiments, separately controlled) as is known in the art.

The membranes can have any suitable pore structure, and can be used in microfiltration, ultrafiltration, and reverse osmosis applications.

The hollow fiber membranes according to any embodiments of the invention can be skinned or unskinned. Alternatively, or additionally, the hollow fiber membranes can be symmetric or asymmetric. For example, in some embodiments the hollow fiber membrane comprises an unskinned membrane, preferably a polymeric unskinned membrane, the membrane can include a convoluted inside surface, and a substantially smooth outside surface or a convoluted outside surface. Alternatively, the membrane can include an inside substantially smooth surface and a convoluted outside surface. In another embodiment comprising unskinned membranes, the hollow fiber membrane can include a convoluted outside surface, and a substantially smooth inside surface or a convoluted inside surface. Alternatively, the membrane can include a substantially smooth outside surface and a convoluted inside surface. In accordance with any of these embodiments, the hollow fiber membrane can be symmetric or asymmetric. In those embodiments wherein the membrane is an asymmetric membrane, the more open area can face the inner surface or the outer surface.

In accordance with other illustrative embodiments wherein the hollow fiber membrane comprises a skinned membrane, preferably a polymeric skinned membrane, the membrane can include an inside skin having a convoluted surface, and a substantially smooth outside surface or a convoluted outside surface. Alternatively, the membrane can include an inside skin having a substantially smooth surface and a convoluted outside surface. In another embodiment comprising skinned membranes, the hollow fiber membrane can include an outside skin having a convoluted surface, and a substantially smooth inside surface or a convoluted inside surface. Alternatively, the membrane can include an outside skin having a substantially smooth surface and a convoluted inside surface.

In some of those embodiments of the invention wherein the membranes are asymmetric, the membranes have larger size pores at the inside surface of the hollow fiber, and smaller size pores at the outside surface. In accordance with some embodiments of the invention, the membranes have a progressive asymmetric structure across the cross-section between the inside surface and the outside surface. Accordingly, the pore distribution, with the largest size pores arranged at or adjacent to the inside surface, and the pores becoming gradually smaller toward the outside surface, can be compared to a funnel. In other embodiments, the membranes have an isotropic structure for at least a portion of the thickness of the membrane between the inside surface and the outside surface. The preferred embodiments of asymmetric membranes according to the invention do not have "hourglass-shaped" pores.

In conventional hollow fiber membranes typically used in inside-out flow applications, the inside surface of the membrane has a smaller pore size than in the outside surface, as it is believed the smaller pores at the inner surface prevent large molecules and debris from entering the pores, thus reducing fouling of the membrane. In contrast, in accordance with some of the embodiments of asymmetric membranes of the present invention, i.e., having at least one convoluted surface (or at least one convoluted and spiraled surface), the average pore size on the inside surface (the inside surface being convoluted or non-convoluted) and in the inner portion is larger than the pores on the outside surface (the outside surface being convoluted or non-convoluted) and in the outer portion, surprisingly resulting in membranes providing efficient filtration (retaining and/or capturing larger molecules, species and debris, while allowing the smaller molecules and species to pass in the permeate) and advantageously providing increased capacity and resistance to fouling.

In some embodiments of asymmetric membranes according to the invention, the membranes have relatively large pores at the inside surface and relatively small pores at the outside surface wherein the pores generally decrease in size across the cross-section of the membrane from the inner surface to the outer surface, and wherein the membrane is substantially free of macrovoids. In some embodiments, the average pore size gradually decreases, or is more or less constant, and then decreases more rapidly across the cross-section of the membrane from the inner surface to the outer surface.

In typical embodiments of asymmetric hollow fiber membranes according to the invention, the ratio of the inside surface pore structure, e.g., the average pore size rating, the average pore diameter, the average pore size, the mean flow pore size (for example, as estimated by one or more of scanning electron microscopy (SEM) analysis, porometry analysis, particle challenge, molecular weight challenge with molecular markers, nitrogen desorption analysis, and bubble point measurement), to the outer surface pore structure is at least about 5 to 1 (this can also be referred to as an asymmetry ratio of at least about 5), more preferably, a ratio of the inside surface pore structure to the outer surface pore structure of at least about 10 to 1 (asymmetry ratio of at least about 10). However, asymmetry can be gradual or abrupt within the thickness of the membrane, and two membranes can have similar ratios of inside surface to outside surface pore structures (e.g., 10 to 1), but with very different internal structures, depending on whether there is a steady gradient of increasing pore sizes, or different regions within the membrane having different gradients of pore size changes.

For microfiltration and ultrafiltration membranes, the ratio of the inside surface pore structure to the outside surface pore structure is more preferably at least about 100 to 1 (asymmetry ratio of at least about 100). In some embodiments, membranes according to the invention have a ratio of the inside surface pore structure to the outside surface pore structure of at least about 1000 to 1 or more (asymmetry ratio of at least about 1000), even at least about 10,000 to 1 (asymmetry ratio of at least about 10,000).

As noted above, some embodiments of membranes according to the invention, having larger pores at the inner surface and in the inner portion of the membrane and smaller pores at the outer surface and outer portion of the membrane, provide an increased capacity and resistance to fouling when compared to conventional membranes for inside-out flow applications, i.e., wherein such conventional membranes have smaller pores at the inner surface and larger pores at the outer surface. Accordingly larger molecules and/or species can be rejected or retained in the inner portion while smaller molecules and/or species pass in the permeate.

With respect to pore structure, ultrafiltration membranes are typically categorized in terms of molecular weight exclusion cutoff (MWCO) values, which can be based on the efficiency of membrane retention of substances having known molecular weights, e.g., polysaccharides or proteins. Accordingly, inventive ultrafiltration membranes can have MWCOs in the range of about 1 kDA (1000 daltons), or less, to about 1,000 kDa (1,000,000 daltons), or more. Illustratively, ultrafiltration membranes according to the invention can have MWCOs of, for example, about 10 kDa or less, about 30 kDa, about 50 kDa, about 100 kDa, or more.

Microfiltration membranes are typically categorized in terms of the size of the limiting pores in the membranes, which, in accordance with the invention, are typically in the outside surface of the membrane and/or adjacent the outside surface of the membrane. Accordingly, microfiltration membranes according to embodiments of the invention can have, for example, limiting pores, mean flow pore sizes, or average pore sizes of about 0.02 microns or more, e.g., in the range of from about 0.03 microns to about 5 microns. Illustratively, inventive microfiltration membranes can have limiting pores, mean flow pore sizes, or average pore sizes of 0.05 microns, 0.1 microns, 0.2 microns, 0.45 microns, 0.65 microns, 1 micron, 2 microns, or larger.

The hollow fiber membrane can have any suitable dimensions, and the dimensions can be optimized for the particular application.

The membranes can have any suitable inside diameter and outside diameter. The outside diameter of the membrane can be, for example, at least about 100 $\mu$m (microns), e.g., in the range of from about 150 microns to about 3000 microns, or more. Typically, the outside diameter is in the range of from about 500 microns to about 1800 microns. The inside diameter of the membrane can be, for example, about 500 microns (0.5 mm), about 1000 microns (1 mm), or about 1500 microns (1.5 mm).

The membranes can have any suitable wall (and/or support region) thickness. Typically, hollow fiber membranes according to the invention have a wall thickness in the range of from about 100 to about 600 microns, more preferably 200 to about 400 microns. However, other embodiments can have thicker or thinner wall thicknesses.

In accordance with preferred embodiments of the invention, the hollow fiber is substantially free of macrovoids, which are finger-like projections or voids that are materially larger in size than the largest pores in the membranes. An advantage of substantially macrovoid membranes according to the invention is that the membranes can be integrity tested, preferably air integrity tested.

In preferred embodiments, the membranes are integral, i.e., they do not have a plurality of layers laminated together. In a more preferred embodiment, the integral membrane is all of one composition.

Filters according to embodiments of the invention can have any number of hollow fiber membranes, and a filter can include hollow fiber membranes with different characteristics. While a filter according to an embodiment of the invention can comprise a single hollow fiber, typically, the filter comprises at least two, preferably, about 10 or more, hollow fiber membranes.

Preferably, hollow fiber membranes according to the invention (as well as filters and filter devices including the membranes) are sterilizable in accordance with protocols known in the art. For example, polysulfone and polyethersulfone membranes according to the invention are typically steam sterilizable.

Some embodiments of hollow fiber membranes according to the invention (and filter devices including the membranes) can be cleaned (and the devices flushed) in accordance with general protocols known in the art. For example, devices according to the invention are typically flushed with buffer or spent filtrate, and the membranes cleaned with caustic solutions such as sodium hydroxide solutions (e.g., about 0.1–0.5N NaOH).

Some embodiments of membranes (and filters and devices including the membranes), particularly some embodiments including larger pores on the inside surface than the outside surface, can be backwashed, wherein the wash fluid passes from the outside small pores through the inside large pores, thus directing the larger contaminants away from the smaller pores, into the bore of the membrane, and through an end of the membrane. As a result, the potential for plugging the membrane caused by pushing the larger contaminants into the smaller pores is reduced.

Membranes according to the invention have a variety of applications, particularly when utilized in filter devices (e.g., modules, cartridges, and cassettes). Typically, the filter device comprises a housing having an inlet and at least one outlet, and a filter comprising one hollow fiber, preferably, two or more hollow fibers, disposed in the housing. While the membranes are preferably used in tangential flow devices, they can also be used in dead end flow devices. They can be used in single pass and multiple pass applications, as well as inside-out and outside-in, flow applications.

Embodiments of filter devices comprising a single hollow fiber membrane, or a few hollow fiber membranes (e.g., 2, 3, or 4 membranes), can be especially for those applications wherein a small volume of fluid is to be filtered.

Applications include gas and/or liquid filtration, for example, water filtration (e.g., particulate and/or microorganism removal from municipal water, or preparation of pure water for microelectronics), filtration of paint, waste water, and particulate, pyrogen, virus and/or microorganism removal from other fluids, including biological fluids such as blood. In preferred embodiments, the membranes are useful in filtering fluids for protein concentration and purification, e.g., for biopharmaceutical applications, e.g., to isolate cell expression products from cells and undesirable cellular matter. Other applications include, for example, cell-virus separation, cell-macromolecule separation, virus-macromolecule separation, macromolecule-macromolecule separation, species-species separation, and macromolecule-species separation.

As noted above, hollow fiber membranes according to some embodiments of the invention, i.e., having pores in the inner surface and inner portion that are larger than the pores at the outer surface and outer portion, provide efficient filtration (rejecting, retaining and/or capturing larger molecules, species and/or debris, while allowing the smaller molecules and/or species to pass in the permeate) and advantageously providing increased capacity and resistance to fouling. In preferred embodiments, the membranes efficiently retain the larger molecules or species while allowing the smaller molecules or species of interest to pass through at a high concentration or throughput.

Additionally, membranes according to embodiments of the invention can be used to fractionate molecules that differ in size in a ratio of about 5 to 1 (i.e., fractionating larger molecules from smaller molecules wherein the larger molecules are about 5 times larger in size than the smaller molecules) or less. More preferably, some embodiments can be used to fractionate molecules that differ in size in a ratio of about 3 to 1 or less, and in some embodiments, can be used to fractionate molecules that differ in size in a ratio of about 2 to 1, or even less.

When compared to conventional hollow fiber devices (having smooth surfaced membranes with smaller pores on the inside surface and larger pores on the outside surface) used in similar applications, embodiments of the invention (wherein the pore size of the inventive membranes is the same as that of the conventional hollow fiber membrane) have at least one of higher fluxes, higher macromolecule transmissions, and higher species transmissions, in some embodiments, about 1.5 or even 2 times greater, that of conventional devices. Moreover, these improvements can be achieved without substantially increasing the transmembrane pressure (TMP).

With respect to capacity, e.g., volume of permeate generated per unit area of the membrane, embodiments of the invention provide higher capacities, in some embodiments, about 2, 4, 5, or even about 6 times that of such conventional devices used in the same applications and having the membranes with the same pore sizes.

The invention also provides filters and filter devices including the hollow fiber membranes for both inside-out flow applications, and outside-in applications.

Embodiments of filter devices according to the invention comprise at least one, more typically, a plurality, of hollow fibers disposed in a housing, the housing including at least one inlet and at least one outlet. For example, one filter device, preferably utilized in dead end filtration applications, comprises a housing having an inlet and an outlet and defining a fluid flow path between the inlet and the outlet, and a filter comprising one or more porous hollow fiber membranes disposed across the fluid flow path, each porous hollow fiber having a convoluted inner surface and an outside surface; wherein the housing is arranged to direct fluid from the inlet, through the convoluted inside surface and the outside surface of the porous hollow fibers, and through the outlet.

In another embodiment of a filter device for dead end filtration applications according to the invention, the device comprises a housing having an inlet and an outlet and defining a fluid flow path between the inlet and the outlet, and a filter comprising one or more porous hollow fiber membranes disposed across the fluid flow path, each porous hollow fiber having a convoluted outer surface and an inside surface; wherein the housing is arranged to direct fluid from the inlet, through the convoluted outside surface and the inside surface of the porous hollow fibers, and through the outlet.

Another filter device, preferably utilized in tangential flow filtration (TFF) applications, comprises a housing having an inlet, a first outlet and a second outlet, the housing defining a first fluid flow path between the inlet and the first outlet, and a second fluid flow path between the inlet and the second outlet; a filter comprising one or more porous hollow fiber membranes disposed across the first fluid flow path and substantially parallel to the second fluid flow path, each porous hollow fiber having an inner convoluted porous surface (or an inner convoluted and spiraled porous surface) and an outer porous surface; wherein the housing is arranged to direct a portion of fluid (preferably, the permeate) from the inlet, through the inside surface and the outside surface of the porous hollow fibers, and through the first outlet, and direct another portion of fluid (preferably, the retentate) from the inlet, along the convoluted inner surface (or the convoluted and spiraled inner surface) and the central bore of the membrane, and through the second outlet.

In another embodiment of a device for TFF applications, wherein the device comprises an inlet, first and second outlets, and a filter comprising at least one fiber, each porous fiber has an outer convoluted porous surface (or outer convoluted and spiraled porous surface) and an inner surface, and the housing is arranged to direct a portion of fluid (preferably, the permeate) from the inlet, through the outside surface and the inside surface of the porous hollow fibers, and along the central bore and through the second outlet, and direct another portion of fluid (preferably, the retentate) from the inlet, along the convoluted outer surface (or the convoluted and spiraled outer surface) and through the first outlet.

In one exemplary embodiment, wherein the filtration device comprises a cylindrical filtration assembly having a bundle of fibers therein wherein the feed fluid is fed from the shell side (permeate collected within the bore), fibers having convoluted outer surface, or convoluted and spiraled outer surfaces can be densely packed in the bundle while allowing sufficient space between the fibers for improved feed distribution, more preferably without including fiber spacer elements such as solid filaments in the bundle or textile weaving to create space between the fibers.

Housings for filter devices can be fabricated from any suitable impervious material, preferably a rigid material, such as any thermoplastic material, which is compatible with the fluid being processed. For example, the housing can be fabricated from a metal, or from a polymer. In a preferred embodiment, the housing is a polymer, preferably a transparent or translucent polymer, such as an acrylic, polypropylene, polystyrene, or a polycarbonated resin. Such a housing is easily and economically fabricated, and allows observation of the passage of the liquid through the housing.

The hollow fiber membrane(s) can be sealed or potted in the housing as is known in the art. Typical sealants or potting materials include, for example, an adhesive such as urethane and/or epoxy.

Typical embodiments of systems according to the invention include at least one filter device as described above, a plurality of conduits, at least one pump (in some embodiments, e.g., involving cell and/or virus separation wherein the filtrate rate is controlled and/or metered, systems typically include at least one additional pump), and at least one container or reservoir. More typically, an embodiment of the system for tangential flow filtration includes a feed reservoir and a filtrate reservoir.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Of course, variations of those preferred embodiments will become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A membrane comprising:
   a porous hollow fiber membrane having an inside porous surface and an outside porous surface, wherein at least one surface includes a convoluted porous surface.

2. The membrane of claim 1, wherein the porous hollow fiber membrane includes a porous hollow polymer fiber membrane.

3. The membrane of claim 1, wherein said at least one surface includes a convoluted inside porous surface.

4. The membrane of claim 1, wherein said at least one surface includes a convoluted outside porous surface.

5. The membrane of claim 1, wherein said convoluted porous surface includes an outside diameter in the form of a sinusoidal shape over an arc.

6. The membrane of claims 1, wherein said convoluted porous surface includes an inside diameter in the form of a sinusoidal shape over an arc.

7. A filter comprising two or more porous hollow fiber membranes of claim 1.

8. A filter device comprising:
   a housing having an inlet and an outlet and defining a fluid flow path between the inlet and the outlet, and two or more porous hollow fiber membranes of claim 1 disposed across the fluid flow path;
   wherein the housing is arranged to direct fluid from the inlet, through the inside surface and the outside surface of the porous hollow fiber membranes, and through the outlet.

9. A filter device comprising:
   a housing having an inlet, a first outlet and a second outlet, the housing defining a first fluid flow path between the inlet and the first outlet, and a second fluid flow path between the inlet and the second outlet;
   two or more porous hollow fiber membranes of claim 1 disposed across the first fluid flow path and substantially parallel to the second fluid flow path;
   wherein the housing is arranged to direct a permeate from the inlet, through the inside surface and the outside surface of the porous hollow fiber membranes, and through the first outlet, and direct a retentate from the inlet, substantially tangentially to the inner surface, and through the second outlet.

10. A filter device comprising:
    a housing having an inlet and an outlet and defining a fluid flow path between the inlet and the outlet, and two or more porous hollow fiber membranes of claim 1 disposed across the fluid flow path;
    wherein the housing is arranged to direct fluid from the inlet, through the outside surface and the inside surface of the porous hollow fiber membranes, and through the outlet.

11. A filter device comprising:
    a housing having an inlet, a first outlet and a second outlet, the housing defining a first fluid flow path between the inlet and the first outlet, and a second fluid flow path between the inlet and the second outlet;
    two or more porous hollow fiber membranes of claim 1 disposed across the second fluid flow path and substantially parallel to the first fluid flow path;
    wherein the housing is arranged to direct a permeate from the inlet, through the outside surface and the inside surface of the porous hollow fiber membranes, and through the second outlet, and direct a retentate from the inlet, substantially tangentially to the outer surface, and through the first outlet.

12. The membrane of claim 1, wherein the porous hollow fiber membrane includes a non-polymeric membrane.

13. The membrane of claim 12, wherein the non-polymeric membrane is a ceramic membrane or a metallic membrane.

14. A membrane comprising:
    a porous hollow polymer fiber membrane having an inside porous surface, an outside porous surface, and a bore, the membrane having an inside diameter and an outside diameter, wherein the inside diameter and/or the outside diameter has a sinusoidal shape over an arc.

15. The membrane of claim 14, wherein the inside diameter has a sinusoidal shape over an arc.

16. The membrane of claim 14, wherein the outside diameter has a sinusoidal shape over an arc.

17. The membrane of claim 14, wherein the porous hollow fiber membrane includes an asymmetric porous hollow fiber membrane.

18. The membrane of claim 14, wherein the inside porous surface includes a coarse porous structure and an outside porous surface having a dense porous structure, the average pore size rating of the pores on the inside surface being greater than the average pore size rating of the pores on the outside surface.

19. The membrane of claim 18, wherein said asymmetric porous hollow fiber membrane includes a progressively asymmetric structure from the inside surface to the outside surface.

20. The membrane of claim 17, further comprising a symmetric porous hollow fiber membrane.

* * * * *